United States Patent [19]

Daspit

[11] 4,000,921
[45] Jan. 4, 1977

[54] TUBULAR CLAMPING AND SEALING COUPLER

[76] Inventor: Ronald Albert Daspit, 2401 Delille St., Chalmette, La. 70043

[22] Filed: July 21, 1975

[21] Appl. No.: 597,637

[52] U.S. Cl. .............................. 285/336; 285/339; 285/351; 285/368; 285/DIG. 2
[51] Int. Cl.² .................................. F16L 23/00
[58] Field of Search .......... 285/368, 412, 343, 339, 285/421, 105, 337, 336, 351, 286

[56] References Cited

UNITED STATES PATENTS

| 783,944 | 2/1905 | Frost | 285/368 X |
| 831,588 | 9/1906 | Wood | 285/368 X |
| 1,447,192 | 3/1923 | Watson | 285/337 |
| 1,686,498 | 10/1928 | Parker | 285/368 X |

FOREIGN PATENTS OR APPLICATIONS

| 227,493 | 5/1963 | Austria | 285/368 |
| 796,712 | 1/1936 | France | 285/368 |
| 19,666 | 8/1913 | United Kingdom | 285/368 |

*Primary Examiner*—Thomas F. Callaghan
*Attorney, Agent, or Firm*—Charles Richard Werner

[57] ABSTRACT

A tubular clamping and sealing coupler for underwater oil or gas pipelines or the like operating under high pressure, providing a fluid-tight joint between the sections of the pipelines, one section of the coupler being firmly secured to the pipe on which it is mounted while the other section of the coupler is mounted on the adjacent pipe and is tightened into sealing and clamping position against the first mentioned coupler, a single operation performing the clamping and sealing and coupling function, said coupler eliminating the need for precise alignment of the pipes or use of a chemical sealing compound.

3 Claims, 4 Drawing Figures

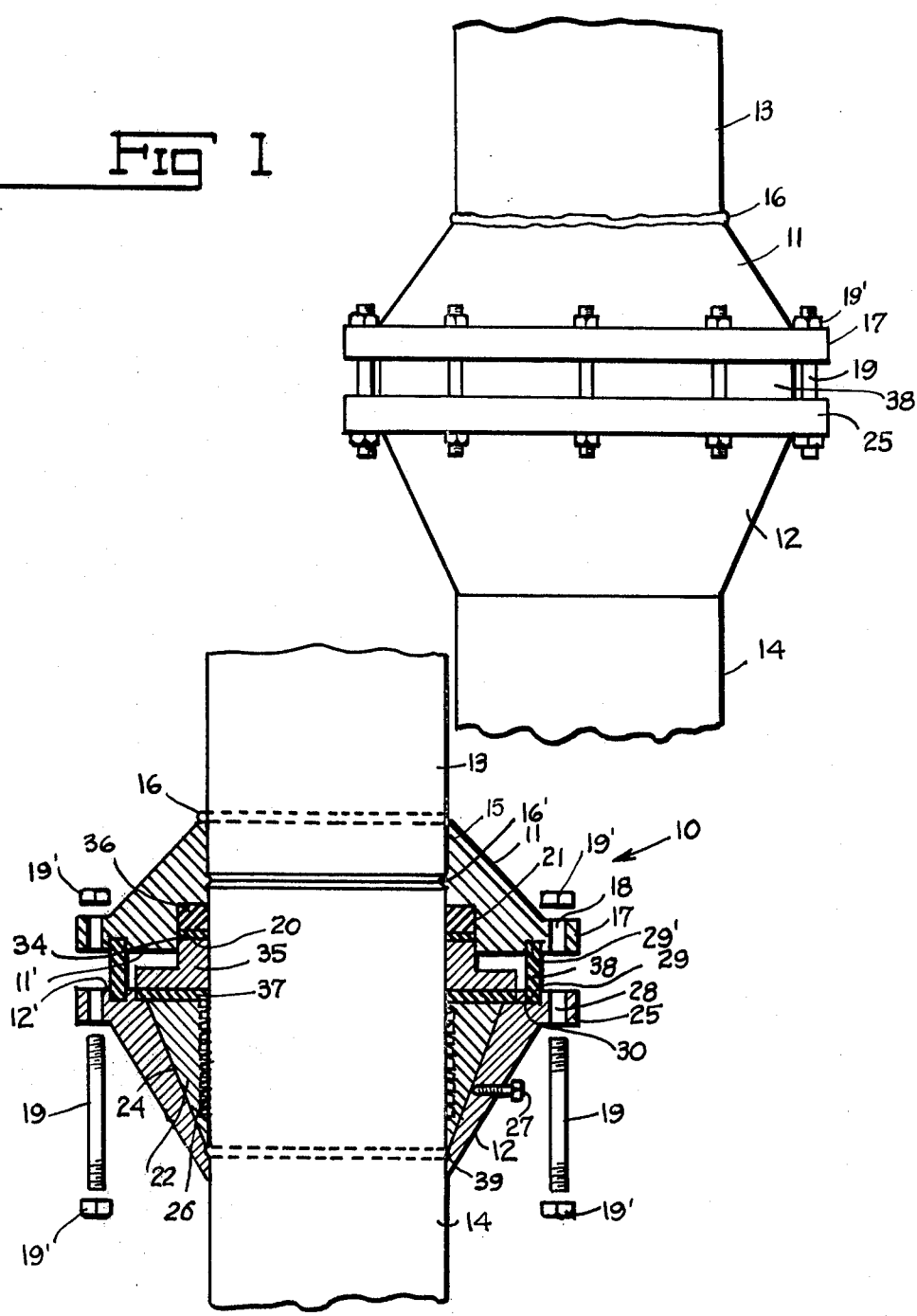

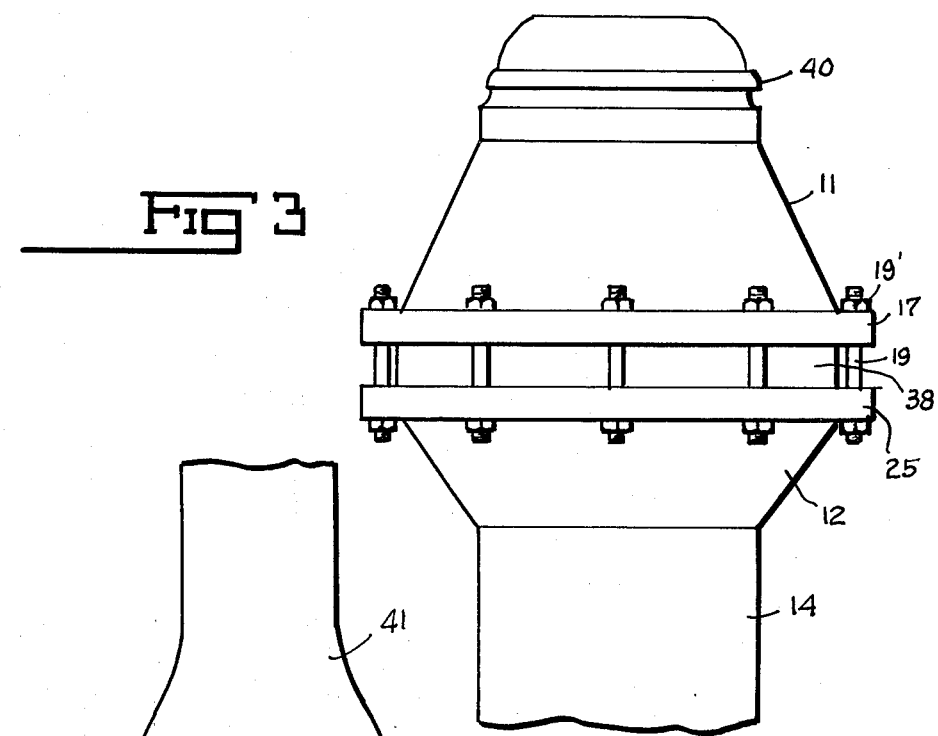
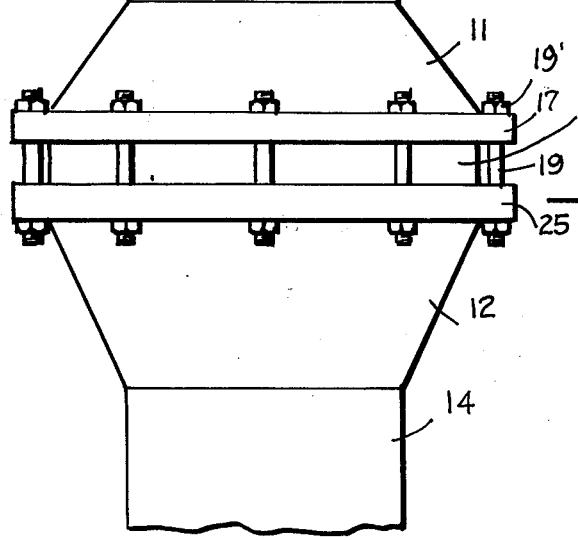

TUBULAR CLAMPING AND SEALING COUPLER

BACKGROUND OF THE INVENTION

In the field of underwater transportation of oil and the like, by means of pipelines, coupling elements between adjacent sections of pipe are required wherein not only a fluid-tight joint between the sections of pipe must be provided but such coupling elements must be capable of being easily repaired inasmuch as such repairs must be done underwater by specialized personnel.

I am aware that couplers exist in the prior art which are of an efficient design insofar as providing a fluid-tight coupling is concerned but these couplings require considerable time and effort on the part of the diver technician who installs such couplings because of the arrangement of the components of said coupling and its final assembly and adjustment.

In addition, because these couplings, due to their design are not detachable and therefor, once applied, cannot be reused under any circumstances, the cost of an underwater installation and maintenance with this type of coupling is considerably increased.

SUMMARY OF THE INVENTION

In accordance with a specific embodiment of the invention, the need for an underwater clamping and sealing coupler for use with oil or gas pipelines or the like, which operate under high pressure, is met in a satisfactory, efficient and economic manner, in comparison to previous devices, by means of a clamp which operates freely about the end of one pipe until it is positioned adjacent the end of another pipe to which it is to be coupled, and the coupling operation is commenced, at which time the clamp will firmly grip the pipe without slippage, to join the adjacent pipe at which time a sealing assembly is applied and secured with the clamp to achieve the clamping and sealing coupling of the two pipe ends, assuring the tightness of the coupler and achieved in one operation, in contrast to conventional couplers in which several operations are required to obtain the final coupling of the pipes.

In view of the foregoing it is one object of the invention to provide in tubular couplers an improved clamping means to lock one of the coupler sections to the end of one pipe.

It is another object of my invention to provide an improved tubular coupler which, in one operation, moves one of the pipes to a position adjacent a joining pipe and seals the protruding means in a fluid-tight manner, clamping one pipe to the other in a safe and efficient sealing manner.

Still another object of the invention is to provide an improved tubular conduit coupling device the design of which permits a low cost construction.

A further object of the invention is to provide an improved tubular coupling in which the clamp means act mechanically and therefore do not require pumps or other means for operation of conventional hydraulic clamps.

One more object of the invention is to provide an improved tubular coupling which can be reused a number of times.

Still a further object of the invention is to provide an improved tubular coupling which does not use chemical sealing compounds which would require a period of time for setting, in contrast to my coupler which employs mechanical sealing means, which act immediately upon securing thereof to the tubular conduits.

Another object of the invention is to provide a coupler for tubular conduits, the improved design of which permits the coupling of pipes which may not be perfectly aligned, inasmuch as the coupler is relatively short in length.

Still another object of the invention is to provide a coupler for tubular conduits, wherein one of the sections may comprise the cap or reducer means in the pipeline in which it is employed.

With the above and other objects in mind it will be apparent that the invention consists of improvements in the design, construction and combination of elements which comprise a tubular, clamping coupler, as described and shown in detail in the attached drawings, which are solely by way of example, it being understood that changes in form, proportion and size may be made without departing from the spirit of my invention.

BRIEF DESCRIPTION OF THE DRAWINGS

In the different views of the drawings the same reference numerals designate the same parts of the invention.

FIG. 1 is a plan view of a coupler joining two ends of pipe in a pipeline or the like.

FIG. 2 is a similar view, partly in section, illustrating the elements of the coupler in assembled position on two ends of adjacent pipes of a pipeline.

FIG. 3 is a plan view of another embodiment in which the coupler is secured to one end of a pipe and receiving a cap member.

FIG. 4 is a plan view of another embodiment in which an end of one pipe is received in the coupler, the other end of said coupler being secured to a diameter reducing unit.

DETAILED DESCRIPTION OF THE PREFERRED EMBODIMENTS

In the drawings reference numeral 10 designates the coupler assembly composed of two coupling sections 11 and 12, carried respectively on the ends of tubular conduits 13 and 14, which may be oil or gas pipelines or the like, the two sections being so positioned that on final assembly they will abut each other as at 16' and be firmly secured one to the other to provide a clamping seal which will prevent leakage of fluid from the adjacent pipes, it being clear, however, that the tubular conduits 13 and 14 need not be in perfect linear alignment as the coupler assembly is so designed that it will compensate for any misalignment in the conduits.

In the preferred embodiment of the improved coupler forming my invention one coupling section 11 is in the form of a body of substantially frustoconical shape, its apex 15 being firmly secured to the pipe 13 by a weld bead 16.

The coupling section 11 has a peripheral flange 17 in which spaced apertures 18 are provided for the reception of fastening members 19 and corresponding nuts 19', the function of which is apparent and the use of which will be described in more detail later in this description.

The planar face 11' of the coupling section 11 is provided with an inner annular recess 20 in which is received an annular sealing member as will be hereinafter described, said sealing member being adapted to be compressed against the shoulder 21, to provide a fluid tight seal.

The counterpart of coupling section 11 comprises an opposing coupling section 12, also of substantially frustoconical shape, as can be seen in the drawings, and which forms a clamping ring, the internally disposed frustoconical surface 24 of which bears against the inner cone 22.

The inner cone 22 is provided with internal gripping projections 26 bearing against the tubular conduit 14, and coupling section 12 is temporarily held in position on inner cone 22 by means of retaining bolt 27, which is later removed when coupling section is in place on the tubular conduit 14.

A peripheral flange 25, corresponding to flange 17 of coupling section 11, is provided on coupling section 12, and has spaced apertures 28, aligned with apertures 18 in coupling section 11 for the reception of the bolts or fastening members 19.

Planar face 12' of the coupling section 12 is provided with an annular slot 29 opposing annular slot 29' in the planar face 11' of coupling section 11, said slots receiving a neoprene sealing ring 38.

The annular recess 20 received an annular neoprene sealing ring 36, the other surface of stepped ring 35 bearing against a flat annular seal 37 resting against the planar end of inner cone 22 and against shoulder 30.

In the operation of the tubular clamping and sealing coupler two essential goals are sought for the efficient performance of same, the first being the firm retention of the ends of the tubular conduits one against the other, this being accomplished by tightening the nuts 19' on bolts 19, forcing coupling section 12 toward coupling section 11 which has been secured to tubular conduit 13 by welding at 16, this being accomplished by the action of frustoconical shaped coupling section 12 acting on inner cone 22 with its internal gripping projections 26 engaging the tubular conduit 14, drawing same into abutting or close relationship with tubular conduit 13 as the nuts on bolts 19 are tightened.

The second essential goal in a sealing coupler of this nature is to attain a positive hermetic seal between the two tubular conduits 13 and 14.

This is achieved by the stepped ring 35 being forced against the flat annular seal 37 in recess 37' on the planar end of inner cone 22 and against shoulder 30, as well as against the Teflon annular member 34 which is being forced against the sealing ring 36 in annular recess 20. Also contributing to the sealing action is annular seal 38 located in slots 29 and 29'. The sealing function is completed by use of an O-ring 39 between the frustoconical shaped coupling section 12 and the tubular conduit 14.

The same principles as enumerated heretofore may be employed in several embodiments of my invention, one being shown in FIG. 3, where a closure cap 40 is secured by welding to coupling section 11, all of the remaining elements being the same as hereinbefore described.

Another embodiment is shown in FIG. 4, where a reducing fitting 41 is welded to coupling section 11, all other elements being the same as those described in FIGS. 1 and 2.

From the foregoing it will be seen that I have provided an efficient and relatively low cost tubular clamping and sealing coupler for underwater oil or gas pipelines which can be quickly and effectively assembled by an underwater diver in an operation where time is at a premium. It will also be seen that precise alignment of the tubular conduits is not required as some misalignment may exist without affecting the sealing action.

It is obvious that changes in form, proportion and details of construction may be resorted to without departing from the spirit of my invention and I reserve all rights to such changes as come within the scope of these specifications and the claims which follow.

I claim:

1. A tubular clamping and sealing coupler for underwater pipelines, in which the ends of two tubular conduits (13) (14) are joined and sealed, comprising a coupling section (11) welded to one of the tubular conduits (13), a second coupling section (12) received on the second tubular conduit (14), gripping projections (26) bearing against the second tubular conduit (14), first, second and third seals (37) (36) (38) between the coupling sections (11) (12) and fasteners (19) (19') drawing the second coupling section (12) and second tubular conduit (14) toward the first coupling section (11) and the first tubular conduit (13) and compressing the seals (37) (36) (38) into sealing position, a stepped ring (35) between the coupling sections (11) (12), one surface of said stepped ring bearing against said second seal (36) in the first coupling section (11) and an opposite surface of the stepped ring bearing against said first seal (37) in the second coupling section (12), said second coupling section (12) having a frustoconical recess therein, a gripping member (22) positioned in said recess, the gripping projections (26) being located on the internal surface of the gripping member (22) adjacent the second tubular conduit (14), and a recess (20) in the first coupling section (11), adjacent the first tubular conduit (13), said second seal (36) received in said recess, and a flat ring (34) received in the recess and bearing against said second seal (36), and confronting annular seats (29) (29'), in said first and second coupling sections to receive said third seal, said first annular seal (37) being flat and resting against gripping member (22) and a shoulder (30) in the second frustoconical coupling section (12), the stepped ring (35) having a flange bearing against said first seal (37) and a collar received in recess (20) and bearing against the ring (34).

2. The tubular clamping and sealing coupler as specified in claim 1, said coupling sections (11) (12) being frustoconical in shape.

3. The tubular clamping and sealing coupler as specified in claim 1, including an annular flange (17) (25) on each coupling section (11) (12), said fasteners (19) passing through apertures (18) in the flanges and drawing flange (25) toward flange (17) into clamping and sealing position.

* * * * *